(12) United States Patent
Hwang

(10) Patent No.: US 9,110,516 B2
(45) Date of Patent: Aug. 18, 2015

(54) FLEXIBLE DISPLAY DEVICE AND METHOD OF TRANSFERRING DATA BETWEEN FLEXIBLE INTERFACE DEVICES

(71) Applicant: Korea Advanced Institute of Science and Technology, Daejeon (KR)

(72) Inventor: Sungjae Hwang, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 306 days.

(21) Appl. No.: 13/710,741

(22) Filed: Dec. 11, 2012

(65) Prior Publication Data

US 2013/0293453 A1 Nov. 7, 2013

(30) Foreign Application Priority Data

May 3, 2012 (KR) ........................ 10-2012-0046860

(51) Int. Cl.
| | |
|---|---|
| G09G 5/00 | (2006.01) |
| G06F 3/03 | (2006.01) |
| G06F 1/16 | (2006.01) |
| H04W 4/20 | (2009.01) |
| G06F 3/0488 | (2013.01) |

(52) U.S. Cl.
CPC ................ *G06F 3/03* (2013.01); *G06F 1/1652* (2013.01); *G06F 3/0488* (2013.01); *H04W 4/206* (2013.01)

(58) Field of Classification Search
CPC ........ G06F 1/1652; G06F 3/03; G06F 3/0488
USPC .......................................................... 345/156
See application file for complete search history.

(56) References Cited

U.S. PATENT DOCUMENTS

| | | | |
|---|---|---|---|
| 8,654,087 B2* | 2/2014 | Kang et al. ..................... 345/173 |
| 2009/0219247 A1* | 9/2009 | Watanabe et al. .............. 345/157 |
| 2010/0045705 A1* | 2/2010 | Vertegaal et al. ............. 345/661 |
| 2010/0056223 A1* | 3/2010 | Choi et al. .................... 455/566 |
| 2011/0057873 A1* | 3/2011 | Geissler et al. ............... 345/156 |
| 2012/0188153 A1* | 7/2012 | Tziortzis et al. .............. 345/156 |

* cited by examiner

*Primary Examiner* — Viet Pham
(74) *Attorney, Agent, or Firm* — Sherr & Jiang, PLLC

(57) ABSTRACT

A method of transferring data between a plurality of flexible interface devices, includes an operation in which the flexible interface devices are flexed due to external force from a user, an operation in which the flexible interface devices acquire flex information generated when the flexible interface devices are flexed, through a plurality of flex sensors, and an operation in which at least one of the flexible interface devices transfers data between the flexible interface devices based on the flex information.

22 Claims, 11 Drawing Sheets

(a)

(b)

FIG. 2
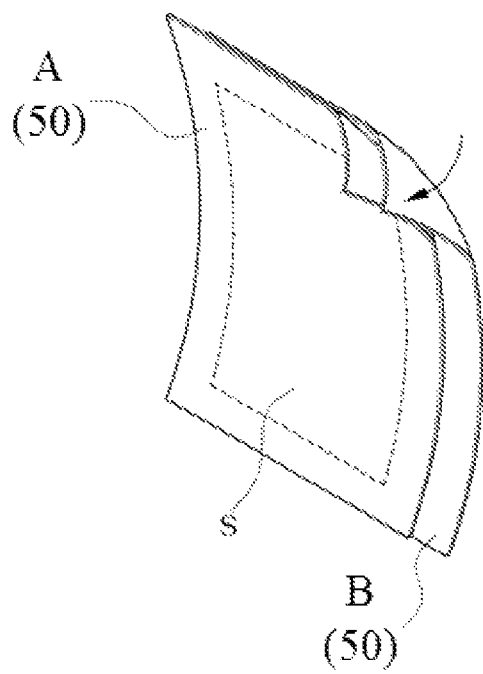
(a)
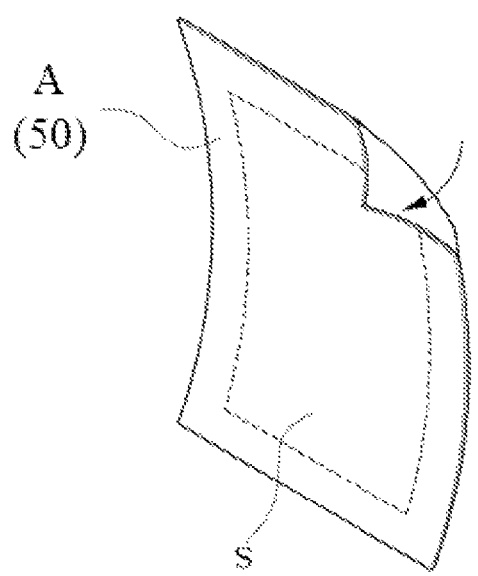
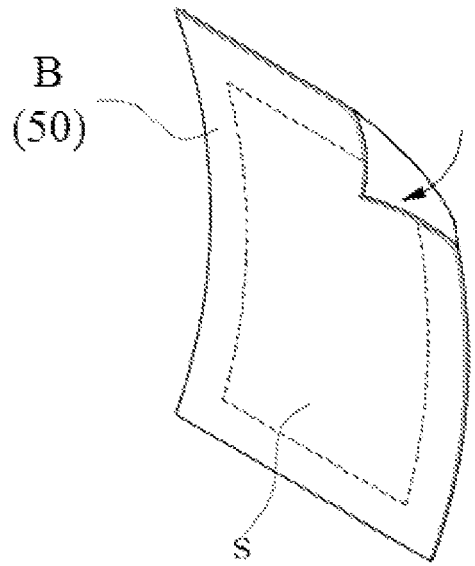
(b)

FIG. 3
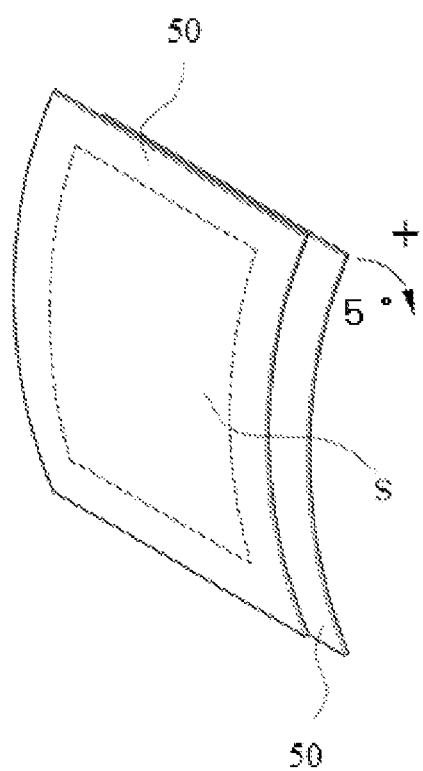
(a)
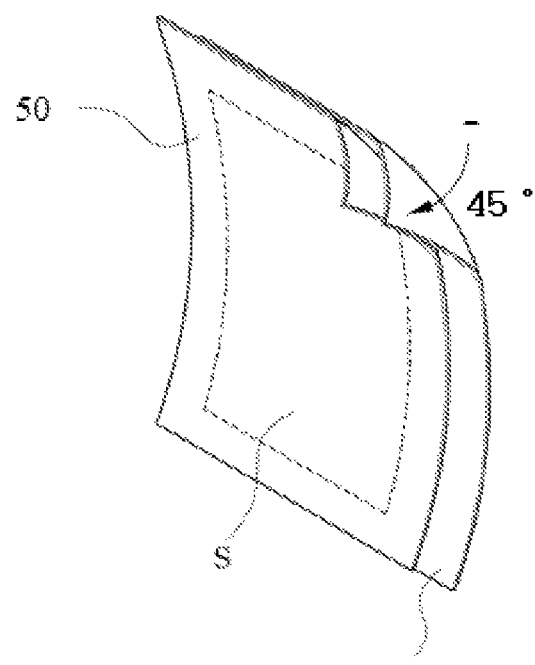
(b)

FIG. 4
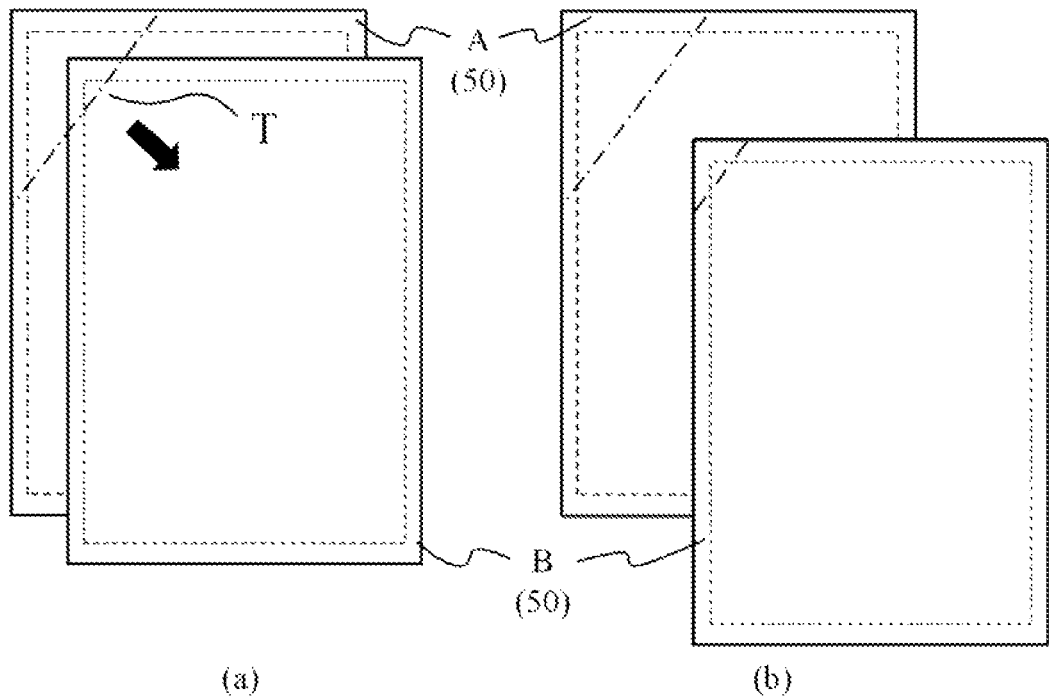
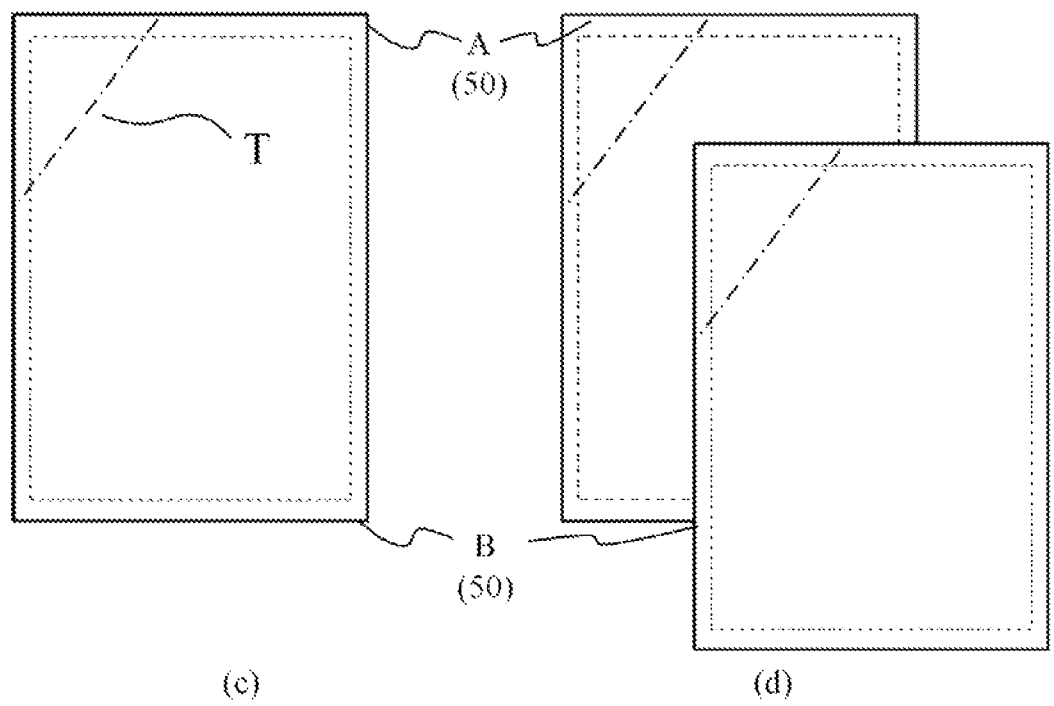

FIG. 9
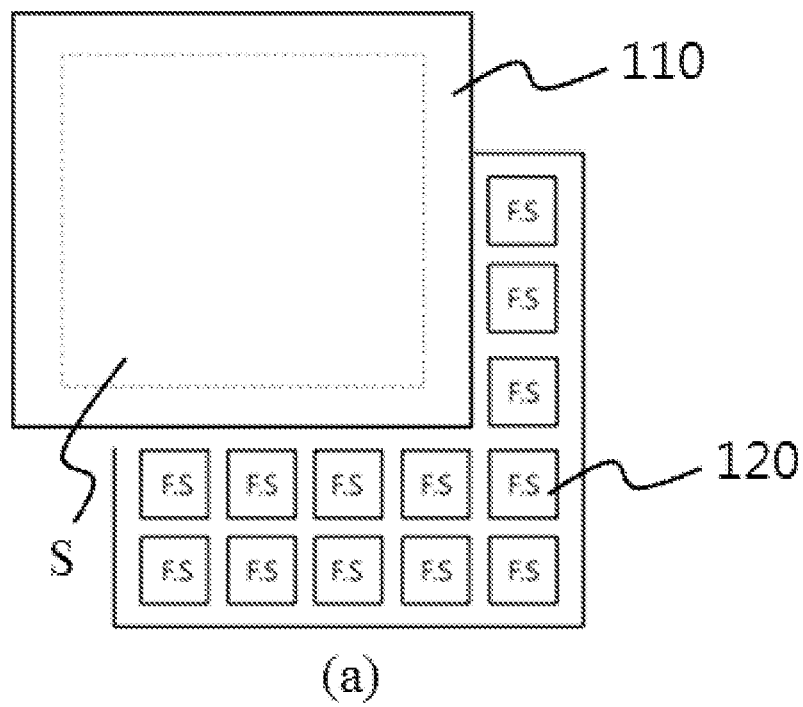
(a)
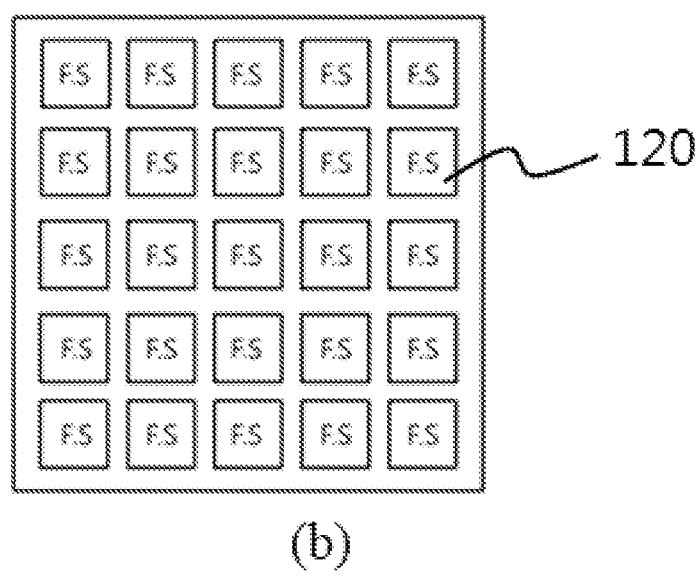
(b)

FLEXIBLE DISPLAY DEVICE AND METHOD OF TRANSFERRING DATA BETWEEN FLEXIBLE INTERFACE DEVICES

CROSS REFERENCE TO PRIOR APPLICATION

The present application claims priority under 35 U.S.C. §119 to Korean Patent Application No. 10-2012-0046860 (filed on May 3, 2012), which is hereby incorporated by reference in its entirety.

TECHNICAL FIELD

The described technology relates generally to a method of transferring data between a plurality of flexible interface devices, and a flexible display device using the data transfer method.

BACKGROUND

With the development of display technology for displaying information, a variety of kinds of displays have been developed, and widely utilized.

Displays developed so far include a liquid crystal display, a thin film transistor-liquid crystal display, an organic light-emitting diode, a flexible display, a 3-dimensional (3D) display, etc.

Lately, a flexible display made of a flexible material such as plastic, instead of an inflexible glass substrate, has attracted attention as a next-generation flat panel display as it can maintain display performance even when it is flexed like paper. The flexible display is easy to carry by folding or rolling up it since the flexible display is not damaged when it is folded or rolled up like paper.

SUMMARY

In one general aspect, there is provided a flexible display device including a display panel configured to allow display in a flexed position, a flex sensor configured to measure first flex information corresponding to a flex of the flexible display panel, a processor configured to provide a data transfer command according to the first flex information, a data memory configured to store content and a communication module configured to transmit or receive the content according to the data transfer command through wireless communication.

The first flex information is one or more pieces of information among a degree of flex, a time at which flex begins, a time period elapsed after flex begins, a time period elapsed after a maximum degree of flex begins, a velocity of flex, an acceleration of flex, velocity at which a flexed position returns to an original position, an acceleration at which a flexed position returns to an original position, a direction of flex, a location of flex, a relative trace of flex, the number of times flex occurs in a reference time period, a spatial location of the flexible interface device, a contact location of the flexible interface device, a combination of the one or more pieces of information, or a pattern created with the one or more pieces of information.

The communication module receives second flex information measured by a target flexible display device adjacent to the flexible display device, and the processor determines whether the first flex information corresponds to the second flex information, and provides the data transfer command if the first flex information corresponds to the second flex information.

In another general aspect, there is provided a method of transferring data between a plurality of flexible interface devices including flexing the plurality of flexible interface devices with external force from at least one user, at the plurality of flexible interface devices, acquiring a plurality of pieces of flex information, wherein each piece of the plurality of pieces of flex information corresponds to a flex of a flexible interface device from which the corresponding flex information is generated, among the plurality of flexible interface devices and at the plurality of flexible interface devices, transferring data between the plurality of flexible interface devices, according to at least one piece of information of the plurality of pieces of flex information.

The transferring of the data between the plurality of flexible interface devices includes at a control server or at least one flexible interface device of the plurality of flexible interface devices, comparing the plurality of pieces of flex information to each other, at the control server or the at least one flexible interface device, obtaining a data transfer command based on the plurality of pieces of flex information if the plurality of pieces of flex information correspond to each other and transferring data between the plurality of flexible interface apparatuses according to the data transfer command.

The transferring of the data between the plurality of flexible interface devices includes transferring the data from a flexible interface device from which flex information is first generated, among the plurality of flexible interface devices, to another flexible interface device, the data being transferred in an order in which flex information is generated.

In the transferring of the data between the plurality of flexible interface devices, the at least one flexible interface device transfers the data to another flexible interface device of the plurality of flexible interface devices, and the data is transferred in a direction in which an internal angle made when the plurality of flexible interface devices are flexed decreases, or in a direction that is opposite to the direction.

In yet another general aspect, there is provided a method authenticating a flexible interface device, including flexing a plurality of flexible interface devices with external force from at least one user, at the plurality of flexible interface devices, acquiring a plurality of pieces of flex information, wherein each piece of the plurality of pieces of flex information corresponds to a flex of a flexible interface device from which the corresponding flex information is generated, among the plurality of flexible interface devices and at least one flexible interface device of the plurality of flexible interface devices, comparing the plurality of pieces of flex information, and performing authentication between the plurality of flexible interface devices.

In yet another general aspect, there is provided a flexible interface device, including at a first flexible interface device that is in a first state, acquiring flex information of a second flexible interface device, wherein the flex information of the second flexible interface device corresponds to a flex of the second flexible interface device and at the first flexible interface device, changing the first state to a second state that is different from the first state, based on the flex information.

In yet another general aspect, there is provided an operation method of a flexible interface device, including at a first flexible interface device, sensing a flex due to external force from a user, and acquiring flex information of the first flexible interface device and at the first flexible interface device, transmitting or receiving data to or from another device based on the flex information of the first flexible interface device.

The Summary is provided to introduce a selection of concepts in a simplified form that are further described below in the Detailed Description. The Summary is not intended to identify key features or essential features of the claimed subject matter, nor is it intended to be used as an aid in determining the scope of the claimed subject matter.

BRIEF DESCRIPTION OF THE DRAWINGS

The above and other features and advantages of the present disclosure will become more apparent to those of ordinary skill in the art by describing in detail example embodiments thereof with reference to the attached drawings in which:

FIG. 2 shows examples in which two flexible interface devices are flexed, wherein (a) shows an example in which the flexible interface devices are flexed while in contact with each other, and (b) shows an example in which the flexible interface devices are flexed while spaced apart from each other;

FIG. 3 shows examples regarding the degree of flex and the direction of flex among flex information;

FIG. 4 shows examples regarding the location of flex among flex information;

FIG. 9 shows an example in which flex sensors are arranged in flexible display (interface) devices;

DETAILED DESCRIPTION

Figure 1:
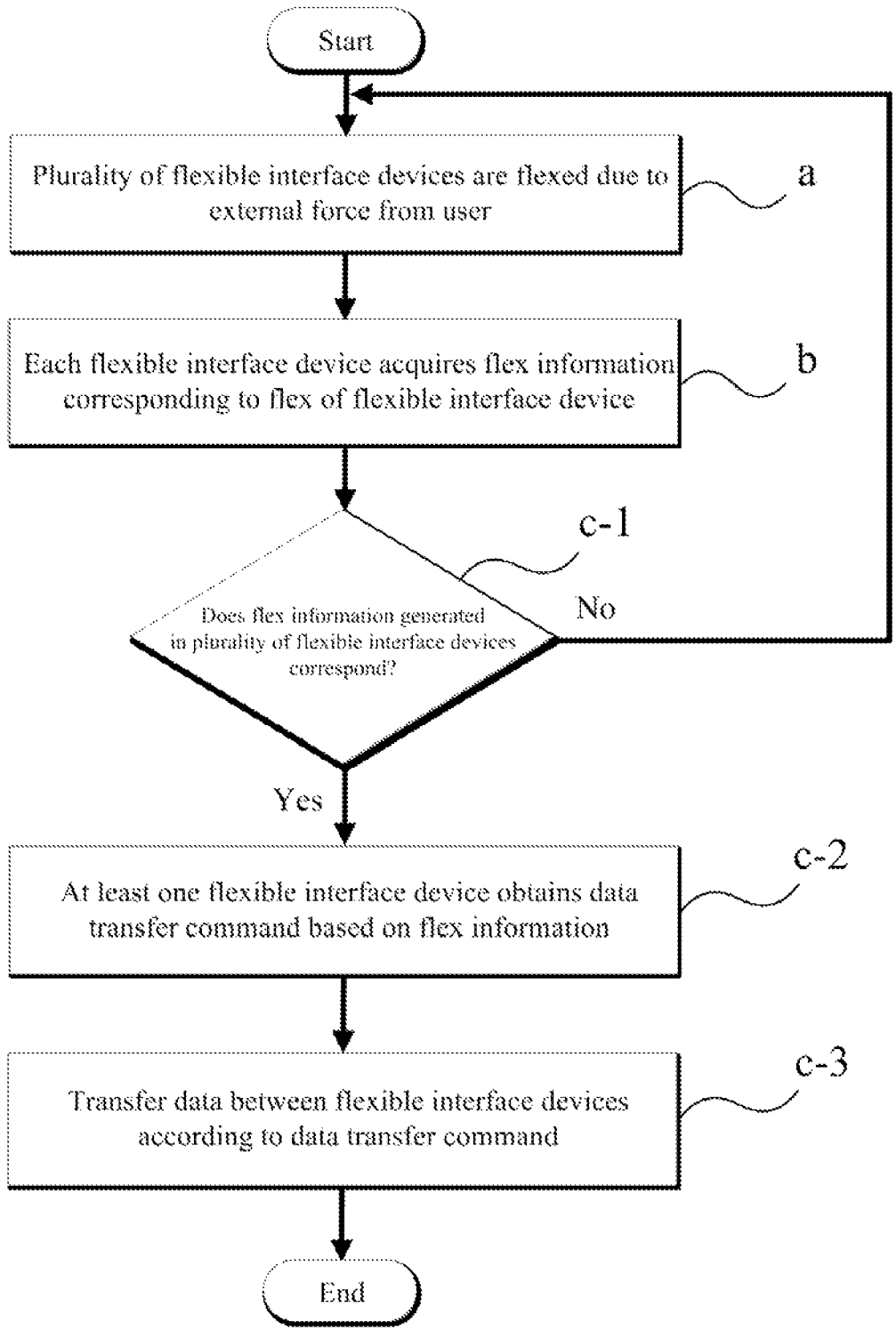
FIG. 1 is a flowchart illustrating an example of a method of transferring data between a plurality of flexible interface devices.

It will be readily understood that the components of the present disclosure, as generally described and illustrated in the Figures herein, could be arranged and designed in a wide variety of different configurations. Thus, the following more detailed description of the embodiments of apparatus and methods in accordance with the present disclosure, as represented in the Figures, is not intended to limit the scope of the disclosure, as claimed, but is merely representative of certain examples of embodiments in accordance with the disclosure. The presently described embodiments will be best understood by reference to the drawings, wherein like parts are designated by like numerals throughout. Moreover, the drawings are not necessarily to scale, and the size and relative sizes of the layers and regions may have been exaggerated for clarity.

It will also be understood that when an element or layer is referred to as being "on," another element or layer, the element or layer may be directly on the other element or layer or intervening elements or layers may be present. As used herein, the term "and/or" may include any and all combinations of one or more of the associated listed items.

Although many studies into a method of representing information in a flexible display technology have been conducted, an interaction method suitable for a flexible display has been not yet proposed. The present disclosure provides an interaction method that can be applied to two or more flexible display devices. The interaction method includes a process of exchanging data between a plurality of flexible display devices.

An example of a data transfer method proposed in the present disclosure is as follows. A user flexes two flexible display devices simultaneously after overlapping the flexible display devices. One of the two flexed flexible display devices transfers data, and the other one receives the transferred data. Hereinafter, the flexible display device that transfers data is referred to as a source flexible display device, and the flexible display device that receives data is referred to as a target flexible display device.

For example, a source flexible display device may transfer stored video content to a target flexible display device, and the target flexible display device may replay the received video content through a video replay application. The received video content may be replayed automatically or when a user executes the video replay application.

Consequently, the present disclosure uses the flexibility property of a flexible display device as an interface method. Specifically, the present disclosure uses the flexibility property of a flexible display device as an interface method for commands for transferring, synchronizing, and exchanging data between two or more flexible display devices.

Since the present disclosure uses a "flex" input as an interface input, the flexible display device has to include a flex sensor for detecting flex.

The flexible display device can be used in various apparatuses. For example, the flexible display device may be used in a mobile terminal such as a smart phone, a tablet PC, a computer display device, etc. Since the present disclosure relates to transferring data in a device such as the flexible display device described above using a "flex" input, the device such as the flexible display device has to include a communication module for transmitting or receiving data.

Consequently, a device that can use the data transfer method according to the present disclosure includes a flexible physical part capable of detecting a flex input, and a communication part capable of transmitting and receiving data. Hereinafter, such a device is referred to as a flexible interface device 50.

The flexible interface device 50 includes Bluetooth for transmitting and receiving data, a communication module that uses near field communication (NFC) or data communication through a 3G, 4G, Wi-Fi, or wired Internet network, etc., and a flexible input module that senses a user's inputs. Also, the present disclosure can be applied to a system having a secondary flexible interface device connected to a computer.

Furthermore, the flexible interface device 50 includes various devices that can use a change in shape caused by external force from a user as an interface method, in addition to interface devices having the flexibility property. For example, the present disclosure can be applied to a stretchable device that a user can stretch using external force. If a user changes the shapes of two or more stretchable devices simultaneously, data is transferred between the two stretchable devices.

FIG. 1 is a flowchart illustrating an example of a method of transferring data between a plurality of flexible interface devices.

The data transfer method includes operation (a) in which the flexible interface devices are flexed due to external force from a user, operation (b) in which the flexible interface devices acquire a plurality of pieces of flex information that are generated when the flexible interface devices are flexed, and operation (c) in which the flexible interface devices transfer data according to one piece of the flex information.

Generally, each flexible interface device is flexed due to external force from at least one user. However, the flexible interface device is not necessarily flexed due to external force from a user. For example, the flexible interface device may be flexed automatically by its own mechanical property or when it is coupled with another device.

In operation (b) in which the flexible interface devices acquire a plurality of pieces of flex information, each flexible interface device acquires its own flex information that is generated when the flexible interface device is flexed. Since the individual flexible interface devices acquire their own flex information, a plurality of pieces of flex information are obtained.

Each piece of the flex information is acquired through a flex sensor that is included in each flexible interface device.

Operation (c) in which the flexible interface devices transfer data includes operation (c-1) in which at least one of the flexible interface devices compares its own flex information to the flex information of the other flexible interface devices, operation (c-2) in which the flexible interface device obtains a data transfer command based on the flex information if its own flex information corresponds to the flex information of the other flexible interface devices, and operation (c-3) in which data is transferred between the flexible interface devices according to the data transfer command.

In operation (c-1), at least one of the flexible interface devices compares its own flex information to the flex information of the other flexible interface devices. For example, if there are two flexible interface devices, including first and second flexible interface devices, in operation (c-1), the first flexible interface device compares its own flex information to the flex information of the second flexible interface device. For this operation, the first flexible interface device should receive the flex information of the second flexible interface device through a communication module.

Also, the second flexible interface device may receive the flex information of the first flexible interface device, and compare the received flex information to its own flex information. In this case, each of the two flexible interface devices compares its own flex information to the flex information of the other flexible interface device.

Or, a separate control server may receive the flex information of the first and second flexible interface devices, and compare the flex information.

In this case, all of the flexible interface devices transmit their own flex information to the control server, and the control server compares the received flex information, and searches for flexible interface devices having similar flex information. The control server determines whether there are a plurality of flexible interface devices to which content is to be transferred based on all of the received information. The control server may transmit signals to the plurality of flexible interface devices to which content is to be transferred, thereby notifying that the plurality of flexible interface devices should transfer content to each other. The control server may perform only operation (c-1) of comparing flex information, or may perform operation (c-2) of obtaining a data transfer command in addition to operation (c-1).

In operation (c-1), at least one of the plurality of flexible interface devices may use various signals, such as a GPS signal, a Wi-Fi signal, a cellular signal, ambient sound, ambient light, an NFC signal, etc., that can be measured by a sensor or a device installed in each flexible interface device, as well as flex information.

In operation (c-1), if the at least one flexible interface device determines that its own flex information corresponds to no flex information of the other flexible interface devices, the plurality of flexible interface devices perform no operation. If the user wants to execute a specific data transfer command, he or she should flex the plurality of flexible interface devices again.

In order to transfer data between the plurality of flexible interface devices, flex information generated by the individual flexible interface devices should correspond. That is, operation (c-1) is to determine whether or not the plurality of flexible interface devices are targets to which data is to be transferred.

The at least one flexible interface device uses its own flex information to determine whether the plurality of flexible interface devices are devices to or from which the user wants to transmit or receive data. One piece of flex information corresponding to another piece of flex information does not mean that all data configuring the one piece of flex information is identical to all data configuring the other piece of flex information. The flex information will be described in detail later.

FIG. 2 shows examples in which two flexible interface devices 50 are flexed, wherein (a) shows an example in which the flexible interface devices 50 are flexed while in contact with each other, and (b) shows an example in which the flexible interface devices 50 are flexed while spaced apart from each other. In FIG. 2, the two flexible interface devices 50 are denoted by A and B, respectively. In FIG. 2, an area denoted by S represents a display area or a display panel on which a screen is displayed in the flexible interface devices A and B.

As described above, (a) of FIG. 2 shows the case in which the two flexible interface devices A and B are flexed while in contact with each other, and (b) of FIG. 2 shows the case in which the two flexible interface devices A and B are flexed while spaced apart from each other. The method of transferring data between the flexible interface devices A and B, according to the present disclosure, may be performed when the two flexible interface devices A and B are flexed while in contact with each other or spaced apart from each other.

Generally, a user may transfer data by bringing two flexible interface devices in contact with each other and flexing the flexible interface devices simultaneously. Also, it is possible for two or more users to transfer data by flexing a plurality of flexible interface devices. When data transfer is performed while a plurality of flexible interface devices are spaced apart from each other, a user need not simultaneously flex the flexible interface devices. That is, the data transfer method may be performed while a plurality of flexible interface devices are spatially spaced apart from each other, as well as when a plurality of flexible interface devices are flexed with a time interval.

However, the data transfer method is generally applied to the case in which a plurality of flexible interface devices are located in a spatially predetermined area. Determination on whether a plurality of flexible interface devices are located in a spatially predetermined area may be based on a GPS signal, a Wi-Fi signal, a cellular signal, ambient sound, ambient light, an NFC signal, an RFID tag, etc. that can be detected by a GPS terminal, a NFC module, etc. installed in each flexible interface device. An area in which a plurality of flexible interface devices transfer data to each other is referred to as a reference area. Information indicating in what area a plurality of flexible interface devices are physically located is referred to as a spatial location. A spatial location can be measured using a GPS terminal, etc.

The flex information may be one or more among a degree of flex, a time at which flex begins, a time period elapsed after flex begins, a time period elapsed after a maximum degree of flex begins, a velocity of flex, an acceleration of flex, a velocity at which a flexed position returns to an original position, an acceleration at which a flexed position returns to an original position, a direction of flex, a location of flex, the number of times flex occurs in a reference time period, a spatial location of the flexible interface device when flex occurs, a contact location of the flexible interface device when flex occurs, a combination of the one or more pieces of information, or a pattern created with the one or more pieces of information.

The degree of flex represents a degree to which the flexible interface device is flexed. The direction of flex represents a side to which the flexible interface device is flexed. The time at which flex begins represents a time at which the flexible interface device begins to be flexed. The time period elapsed after flex begins represents a time period that has elapsed from when the flexible interface device began to be flexed to when the flexible interface device returns to its original position. The time period elapsed after a maximum degree of flex begins represents a time period elapsed after the flexible interface device is flexed to a maximum degree. The velocity of flex represents a velocity at which the flexible interface device is flexed at a specific time. The acceleration of flex represents an acceleration at which the flexible interface device 50 is flexed at a specific time. The velocity at which the flexed position returns to the original position represents velocity at which the flexible interface device returns to its original position after being flexed at a specific time. The acceleration at which the flexed position returns to the original position represents an acceleration at which the flexible interface device returns to its original position after being flexed at a specific time.

The location of flex represents a specific flexible interface device that is flexed. Or, the location of flex represents a physical location at which the flexible interface device is flexed. The contact location represents information about locations at which a plurality of flexible interface devices come in contact with each other. If two flexible interface devices A and B come in contact with each other, the contact location represents location information about portions at which the flexible interface device A comes in contact with the flexible interface device B. The contact location may be sensed by a contact sensor.

Information about contact locations is required because two flexible interface devices can come in contact with each other in various manners. That is, two flexible interface devices may come in contact with each other such that they overlap completely, such that one is disposed at a predetermined angle with respect to the other one, or such that one is horizontally spaced apart from the other one. Also, two flexible interface devices having different sizes may be flexed while in the contact with each other. In this case, the flexible interface devices have different locations of flex.

Even when a plurality of flexible interface devices are simultaneously flexed, the flexible interface devices have different locations of flex when their contact locations or sizes are different.

Referring again to FIG. 1, in operation (c-1) of comparing the flex information, it is determined whether a plurality of flexible interface devices correspond to each other based on the location of flex among the flex information. For this operation, in operation (c-1) of comparing the flex information, both flex location information and contact location information of the flex information are used. By comparing contact locations which are relative locations at which the plurality of flexible interface devices come in contact with each other, together with flex location information, it can be determined whether the flexible interface devices are simultaneously flexed while in contact with each other.

The number of times flex occurs in a reference time period represents the number of times the flexible interface device is flexed and returns to its original position in a predetermined time period.

As described above, information about a predetermined area in which a flexible interface device is located may be measured by a GPS terminal, etc. installed in the flexible interface device. Contact locations at which a plurality of flexible interface devices come in contact with each other may be measured by pressure sensors, etc. installed in the flexible interface devices. If a plurality of flexible interface devices having the same size or different sizes come in contact with each other, a plurality of pressure sensors can sense locations at which the flexible interface devices come in contact with each other.

The flex information as described above is used in operation (c-1) of comparing flex information. In operation (c-1), it is determined whether the plurality of flexible interface devices 50 are devices to which data is to be transferred. In operation (c-1), determination on whether the flexible interface devices 50 are devices to which data is to be transferred may be performed based on one or more pieces of the flex information, a combination of the one or more pieces of information, or a pattern in which the one or more pieces of information are repeated. Other than a method of using a GPS terminal to detect location coordinates, there is an indirect method of determining whether the plurality of flexible interface device 50 approach or come in contact with each other. For example, if the times at which flex begins, the time periods elapsed after flex begins, the degrees of flex, the acceleration at which the flexed positions return to the original positions, etc. with respect to a plurality of flexible interface devices 50 are identical to each other, it can be indirectly determined that the flexible interface devices 50 approach or come in contact with each other.

In operation (c-1), if the flexible interface devices 50 use no spatial location, no GPS terminal is required, and if the flexible interface devices 50 use no contact location, no pressure sensor is required.

Also, the flex information may be a combination of the above-described information or a pattern in which the above-described information is repeated at regular time intervals. For example, a flex pattern includes a pattern of flexing a flexible interface device 50 with a small degree in a direction and then flexing the flexible interface device 50 with a great degree after a predetermined time period elapses, a pattern of flexing the flexible interface device 50 in a direction and then flexing the flexible interface device 50 in the reverse direction, a pattern of flexing the flexible interface device 50 in a wave form, etc.

FIG. 3 shows examples regarding the degree of flex and the direction of flex among the flex information. In FIG. 3, an area denoted by S represents a display area on which a screen is displayed in each flexible interface device 50. Accordingly, it is assumed that the flexible interface devices 50 shown in FIG. 3 correspond to flexible display devices, and the display area is located on one side of each flexible display device.

(a) of FIG. 3 shows an example in which the flexible interface devices 50 are flexed such that the display areas S are convex. The direction of flex corresponding to this case is defined as +. In this case, the degree of flex is 5°. (b) of FIG. 3 shows an example in which the flexible interface devices 50 are flexed such that the display areas S are concave. The direction of flex corresponding to this case is defined as −. In this case, the degree of flex is 45°.

FIG. 4 shows examples regarding the location of flex of the flex information. (a) of FIG. 4 corresponds to the case in which flexible interface devices A and B are flexed while the flexible interface device B moves horizontally in the direction of an arrow with respect to the flexible interface device A. In FIG. 4, alternating long and short dash lines denoted by T correspond to the locations of flex generated in the individual flexible interface devices A and B.

(b) of FIG. 4 shows the flex locations of the flexible interface devices A and B more clearly by further moving the flexible interface device B in the direction of the arrow. (a) and (b) of FIG. 4 correspond to the case in which the flexible interface devices A and B have different locations of flex. Like (a) of FIG. 4, although the flex location of the flexible interface device A is different from the flex location of the flexible interface device B, it can be determined that the flexible interface devices A and B are simultaneously flexed by checking the contact locations of the flexible interface devices A and B. (c) of FIG. 4 shows the case in which the flexible interface devices A and B overlap completely. (d) of FIG. 4 clearly shows the flex locations of the flexible interface devices A and B in (c) of FIG. 4. (c) and (d) of FIG. 4 correspond to the case in which the flexible interface devices A and B have the same flex location.

Referring to FIGS. 1 and 3, in operation (c-1) of comparing the flex information, at least one flexible interface device 50 of a plurality of flexible interface devices 50 receives the flex information of the other flexible interface devices 50 through a communication module, and compares the received flex information to its own flex information.

As described above, one or more of the plurality of flexible interface devices 50 may compare received flex information to its own flex information. In order for a flexible interface device 50 to compare its own flex information to flex information of other flexible interface devices, the flexible interface device 50 should receive the flex information of all of the other flexible interface devices. If a plurality of flexible interface devices compare their flex information, each flexible interface device should receive the flex information of the other flexible interface devices, and transmit its own flex information to the other flexible interface devices through a communication module.

In operation (c-1) of comparing the flex information, if the flex information of at least one flexible interface device 50 among a plurality of flexible interface devices 50 is identical to the flex information of the other flexible interface devices 50, it is determined that the flex information corresponds, wherein the flex information includes at least one among the directions of flex, the velocities of flex, the accelerations of flex, the velocities at which the flexed positions return to the original positions, the accelerations at which the flexed positions return to the original positions, the numbers of times flex occurs in a reference time period, and the spatial locations of the flexible interface devices 50. The flex information generated in the at least one flexible interface device 50 is referred to as first flex information, and the flex information generated in the other flexible interface devices 50 is referred to as second flex information. That is, the second flex information is the flex information of the flexible interface devices 50 other than the at least one flexible interface device 50 among the plurality of flexible interface devices 50. Accordingly, the second flex information includes one or more pieces of flex information.

If the plurality of flexible interface devices 50 are flexed while in contact with each other, the directions of flex, the velocities of flex, the accelerations of flex, the velocities at which the flexed positions return to the original positions, the accelerations at which the flexed positions return to the original positions, the numbers of times flex occurs in a reference time period, the spatial locations of the flexible display devices 50, etc., among the flex information, may have the same values among the plurality of flexible interface devices 50.

If the plurality of flexible interface devices 50 are flexed while spaced apart from each other, at least one of the directions of flex, the numbers of times flex occurs in a reference time period, and the spatial locations of the flexible display devices 50, among the flex information, may have the same values.

In operation (c-1) of comparing the flex information, if at least one of the degrees of flex, the times at which flex beings, the time periods elapsed after flex begins, the time periods elapsed after a maximum degree of flex begins, the velocities of flex, the accelerations of flex, the velocities at which the flexed positions return to the original positions, the directions of flex, the locations of flex, the relative traces of flex, the numbers of times flex occurs in a reference time period, and the spatial locations of the flexible display devices 50, among the plurality of pieces of flex information generated in the plurality of flexible interface devices 50, are identical to each other within the margin of error, it is determined that the pieces of the flex information that are compared correspond to each other. In this case, it is assumed not that the pieces of flex information generated in the plurality of flexible interface devices 50 are the same, but that they are within a predetermined margin of error.

For example, at least one flexible interface device 50 of a plurality of flexible interface devices 50 may determine whether the flex information of the flexible interface device 50 corresponds to the flex information of the other flexible interface devices 50 using only the degrees of flex and the locations of flex. Or, the flexible interface device 50 may determine whether the flex information of the flexible interface device 50 corresponds to the flex information of another flexible interface device 50 depending on whether the flexible interface device 50 approaches the other flexible interface device 50 and the two flexible interface devices 50 are simultaneously flexed. In the latter case, it may be determined whether the flex information of the flexible interface device 50 corresponds to the flex information of the other flexible interface device 50 additionally based on the time periods elapsed after flex begins.

Which of the plurality of pieces of flex information the at least one flexible interface device 50 uses to determine a correspondence of flex information depends on a user's setting. The correspondence of flex information may be accurately determined by using all the plurality of pieces of flex information. However, the correspondence of flex information may be determined by selectively using flex information according to an environment in which the flexible interface device 50 is used.

Figure 5:
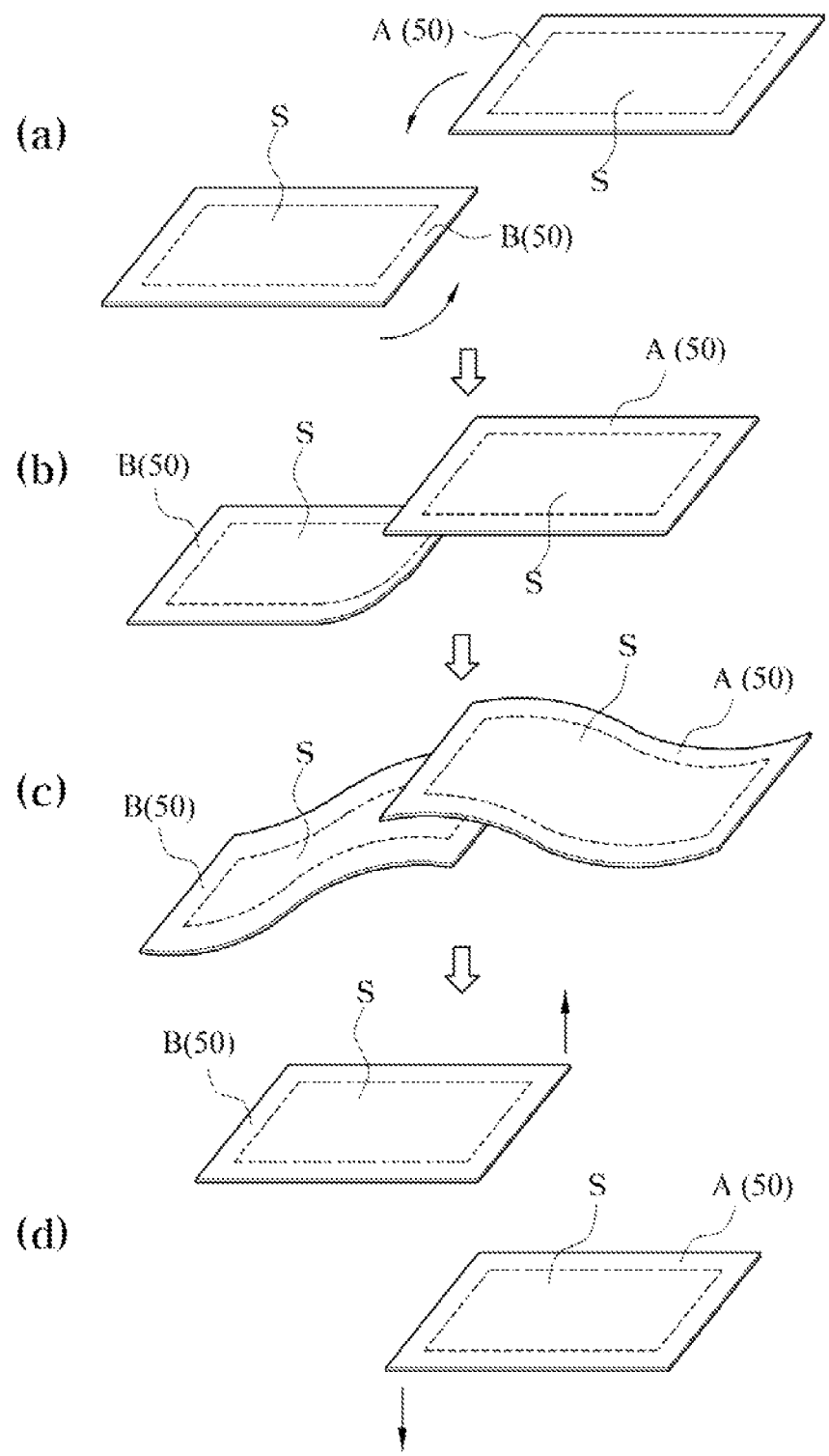
FIG. 5 shows an example in which a plurality of flexible interface devices transfer data through a flicking gesture.

FIG. 5 shows an example in which a plurality of flexible interface devices 50 (A and B) transfer data through a flicking gesture. (a) through (d) of FIG. 5 show the states in which the flexible interface devices A and B are in contact with each other and are flexed through a flicking gesture, in time order. In detail, (a) of FIG. 5 shows the state in which the flexible interface device A approaches from above and the flexible interface device B approaches from below, (b) of FIG. 5 shows the state in which the flexible interface devices A and B begin to come in contact with each other, (c) of FIG. 5 shows the state in which the flexible interface devices A and B are flexed while in contact with each other, and (d) of FIG. 5 shows the state in which the flexible interface devices A and B move away from each other after being in contact.

As shown in FIG. 5, when the flexible interface devices 50 come in contact with each other, the direction in which one of the flexible interface devices 50 is flexed is opposite to the direction in which the other one is flexed. That is, if the flexible interface device A is flexed in a downward direction to come in contact with the flexible interface device B, a portion at which the flexible interface device A comes in contact with the flexible interface device B is flexed in an upward direction, and a portion at which the flexible interface device B comes in contact with the flexible interface device A is flexed in the downward direction.

When the flexible interface devices 50 come in contact with each other through the flicking gesture, the contact locations and the locations of flex depend on the locations at which the flexible interface devices 50 come in contact with each other, and the flex directions of the flexible interface devices 50 are opposite to each other. Flex information generated when the flexible interface devices 50 come in contact and are flexed through the flicking gesture has a predetermined pattern.

Accordingly, in this case, determination of whether the flex information corresponds may depend on whether flex patterns correspond to each other. Whether the flex information corresponds may be determined by comparing flex patterns stored in memories installed in the flexible interface devices 50 to flex patterns that have actually occurred.

Referring to FIGS. 1 and 5, operation (c-2) of interpreting the data transfer command is performed by matching the flex information of at least one flexible interface device 50 with a data transfer command stored in a command table of a memory installed in the flexible interface device 50.

The data transfer command may be interpreted as at least one of a command for transmitting content from a source flexible interface device 50 to a target flexible interface device 50, a command for causing a source flexible interface device 50 to receive content from a target flexible interface device 50, a command for synchronizing the content of a source flexible interface device 50 with the content of a target flexible interface device 50, a command for transmitting content from a source flexible interface device 50 to a plurality of flexible interface devices 50, a command for causing a plurality of target flexible interface devices to receive content from a source flexible interface device 50, and a command for synchronizing the content of a source flexible interface device 50 with the content of a plurality of target flexible interface devices 50.

The content may be various formats of data, such as picture data, video data, document data, text data, compressed data files, files executable in a computer, address data stored in a smart phone, package data used in a specific application, etc.

An example of transferring content includes the case of transferring email addresses stored in a source interface device 50 to a target flexible interface device 50, the case of transferring a video file that is replayed in a source flexible interface device 50 to a target flexible interface device 50 and replaying the video file in the target flexible interface device 50, etc. The case of transferring the video file includes the case of streaming video stored in the source flexible interface device 50 in the target flexible interface device 50.

An example of synchronizing content includes an example of synchronizing address data stored in a source flexible interface device 50 with address data stored in a target flexible interface device 50.

The source flexible interface device 50 or the target flexible interface device 50 may be decided based on flex information. For example, the source flexible interface device 50 or the target flexible interface device 50 may be decided based on the direction in which the corresponding flexible interface device 50 is flexed.

Accordingly, in operation (c-3) of transferring data, data may be transferred in a direction in which an internal angle made when a source flexible interface device 50 is flexed decreases, or in a direction that is opposite to the direction in which the internal angle decreases. Since data synchronization is necessarily accompanied by data transfer, data transfer includes data synchronization.

Figure 6:
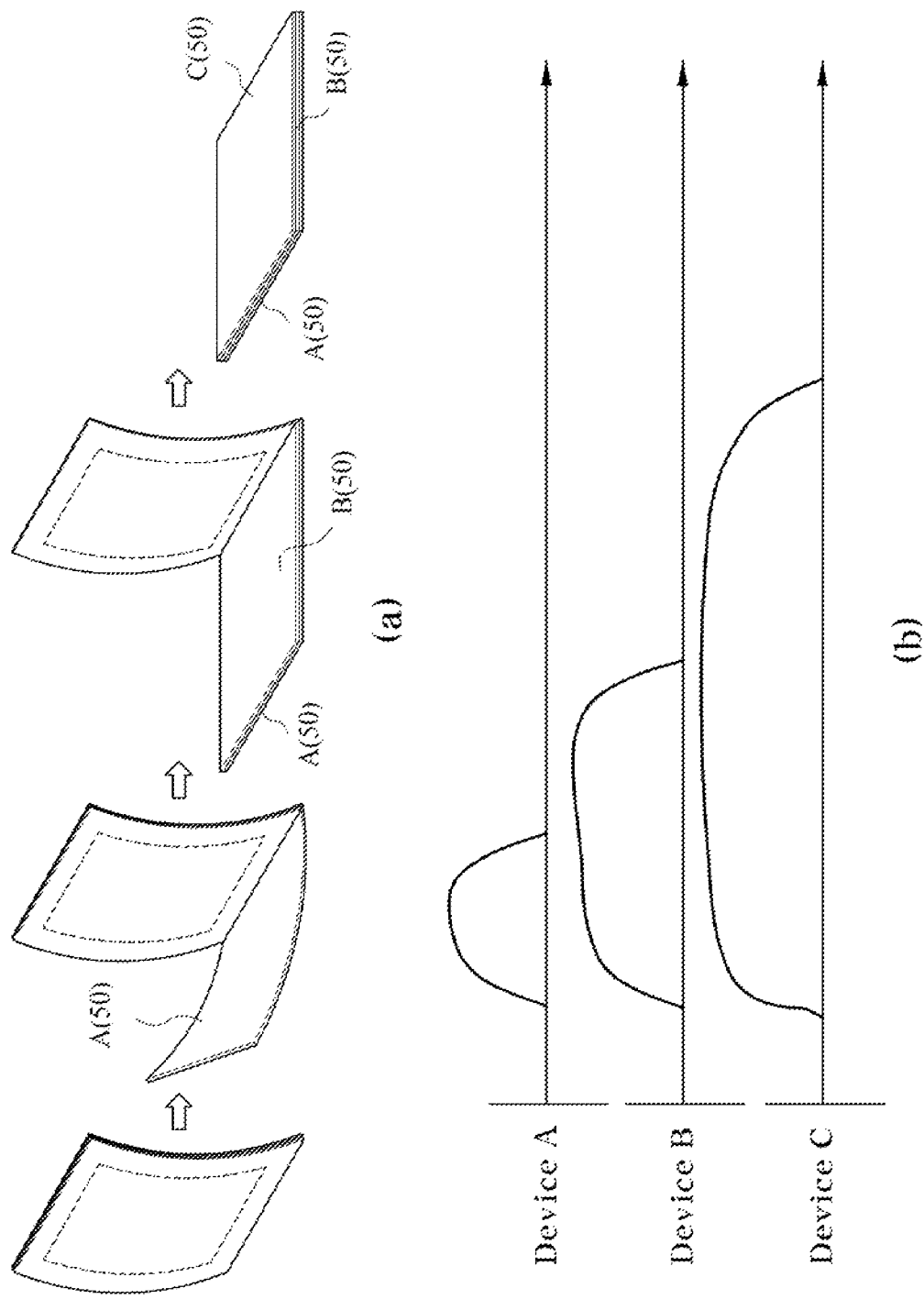
FIG. 6 shows an example in which a plurality of flexible interface devices transfer data sequentially while in contact with each other.

FIG. 6 shows an example in which a plurality of flexible interface devices 50 transfer data sequentially while in contact with each other. (a) of FIG. 6 shows the state in which the plurality of flexible interface devices 50 that are in contact with each other sequentially return to their original positions from their flexed positions. The state shown in (a) of FIG. 6 is similar to the case where cards are spread out after being flexed. (b) of FIG. 6 shows measurement results of flex sensors installed in the flexible interface devices 50 when the flexible interface devices 50 that have been flexed in a specific direction return to their original positions sequentially. In the example of FIG. 6, a flexible interface device 50 that first returns to its original position is the uppermost one of the plurality of flexible interface devices 50. In FIG. 6, parts denoted by dotted lines are areas such as display screens formed in one sides of the flexible interface devices 50. If the flexible interface devices 50 are flexed in the reverse direction, a flexible interface device that first returns to its original position is the lowermost one of the plurality of flexible interface devices 50.

As shown in FIG. 6, when the plurality of flexible interface devices 50 sequentially return to their original positions, the flexible interface device A that first returns to its original position may be a source flexible interface device 50, and data stored in the source flexible interface device A may be sequentially transferred to the flexible interface devices B and C. With regard to the relationship between the flexible interface device A and the flexible interface device B, the flexible interface device A is a source flexible interface device 50, and the flexible interface device B is a target flexible interface device 50. With regard to the relationship between the flexible interface device B and the flexible interface device C, the flexible interface device B is a source flexible interface device 50, and the flexible interface device C is a target flexible interface device 50.

Referring to FIGS. 1 and 6, in operation (c-3) of transferring data, when flex information is generated in a plurality of flexible interface devices 50, data is transferred from a flexible interface device 50 from which flex information is first generated to another flexible interface device 50. At this time, the data may be transferred between flexible interface devices in the order in which flex information is generated.

Figure 7:
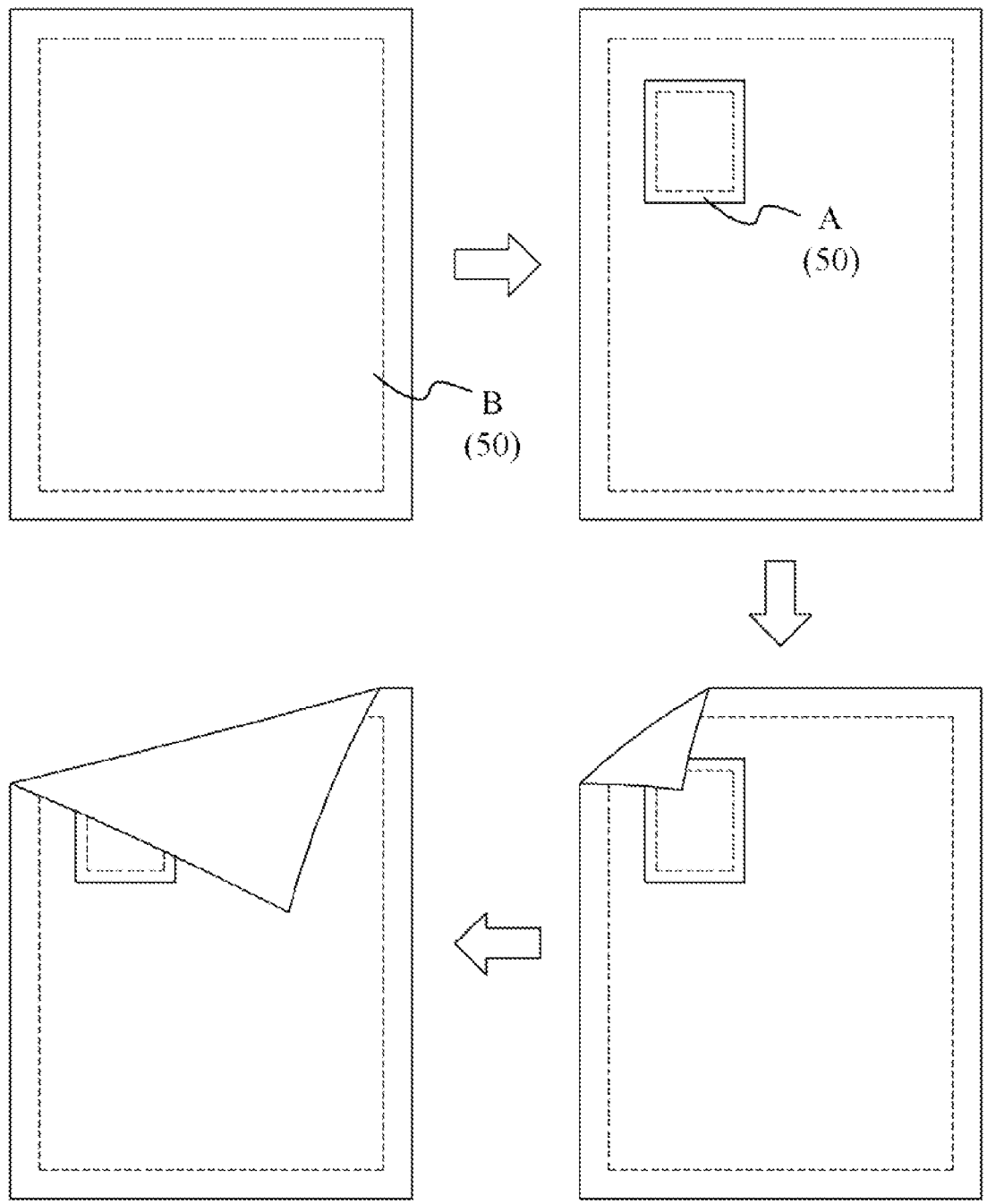
FIG. 7 shows an example in which a plurality of flexible interface devices having different sizes transfer data while in contact with each other.

FIG. 7 shows an example in which a plurality of flexible interface devices 50 having different sizes transfer data while in contact with each other. The flexible interface devices 50 may have different sizes as shown in FIG. 7. For example, the example of FIG. 7 may correspond to the case in which the two flexible interface devices 50 are flexed while a smart phone having a size similar to a human's palm is put on a tablet PC.

In the example of FIG. 7, if a user flexes a large flexible interface device B along with a small flexible interface device A when the small flexible interface device A is put on the large flexible interface device B, data stored in the small flexible interface device A is transferred to the large flexible interface device B.

In detail, it is assumed that the flexible interface device B executes an application of outputting pictures or images. Also, it is assumed that the flexible interface device B executes the corresponding application on the entire screen or on a specific screen area. In this case, if the user flexes the two flexible interface devices A and B after putting the flexible interface device A on the flexible interface device B, pictures or images stored in the flexible interface device A may be displayed on the flexible interface device B.

If an application of outputting pictures is executed on a screen area 1 of the flexible interface device B, and an application of outputting video is executed on a screen area 2 of the flexible interface device B, different kinds of data may be transferred according to whether the user puts the flexible interface device A on the screen area 1 or on the screen area 2. Data that can be used by the application being executed in the flexible interface device B may be transferred from the flexible interface device A.

Another example of transferring data as shown in FIG. 7 is an example of executing an N screen mode by transmitting a video being replayed on a small flexible display device to a large-screen flexible display device.

The present disclosure as described above relates to the case in which a plurality of flexible interface devices 50 are flexed. In the present disclosure, according to another example of an operation method of a plurality of flexible interface devices, only one of the plurality of flexible interface devices 50 is flexed, and flex information of the flexible interface device 50 is used as a command.

The operation method of the flexible interface devices 50 includes an operation in which a first flexible interface device 50 senses a flex due to external force from a user to acquire flex information of the first flexible interface device 50, and an operation of transmitting/receiving data to/from another device based on the flex information of the first flexible interface device 50.

The other device may be a device capable of receiving data, such as a TV, a computer, or the like. For example, a user may transmit specific data stored in the first flexible interface device 50 to his or her computer through wireless communication. Also, the user may use the first interface device 50 as a remote controller. The user may flex the first flexible interface device 50 to a specific position to change the channel of a TV or to turn the volume up or down. In this case, the flexible interface device 50 may transfer a specific command to the TV using an infrared device, as well as a wireless communication method.

The other device may be another flexible interface device 50. That is, the user may flex only the first flexible interface device 50 to transmit data stored in the first flexible interface device to a second flexible interface device 50, or to cause the first flexible interface device 50 to receive data stored in the second flexible interface device 50.

Another example of the operation method of the flexible interface devices 50 includes an operation in which a first flexible interface device 50 that is in a first state acquires flex information of a second flexible interface device 50, wherein the flex information of the second flexible interface device 50 corresponds to a flex of the second flexible interface device 50, and an operation in which the first flexible interface device 50 changes the first state to a second state, which is different from the first state, based on the flex information.

The first flexible interface device 50 acquires flex information of the second flexible interface device 50, and changes the state of the first flexible interface device 50 based on the acquired flex information.

For example, if the first flexible interface device 50 acquires flex information a, the first flexible interface device 50 changes a standby mode (a first state) to an activation mode (a second state). The activation mode represents a state in which a specific function can be performed, such as a state in which data can be transmitted, a state in which power is supplied to a display, or a state in which an input to a touch panel, etc. is allowed.

Generally, the second state has a higher power consumption than the first state. For example, if it is assumed that the flexible interface device 50 is a flexible display device having maximum luminance of 100, the first flexible interface device 50 may show luminance of 10 in the first state, and luminance of 70 in the second state.

As another example, if the first flexible interface device 50 acquires flex information b, the first flexible interface device 50 increases the amount of data traffic. For example, the first state may be a state in which no data transfer occurs between first and second flexible interface devices, or a state in which a data transfer rate between first and second flexible interface devices is lower than a data transfer rate between the first and second flexible interface devices in the first state. Also, the first flexible interface device may limit the amount of data traffic while changing its state between the first and second states.

As another example, if a first flexible interface device 50 acquires flex information c from a second flexible interface device 50, the first flexible interface device 50 may perform a function corresponding to the flex information c of the second flexible interface device 50. For example, the first flexible interface device 50 may play specific music or a video according to the flex information of the second flexible interface device 50.

Also, the first flexible interface device 50 may acquire its own flex information as well as the flex information of the second flexible interface device 50, and change the first state to the second state according to the flex information of the first and second flexible interface devices 50.

In this case, the flex information of the first flexible interface device 50 may be substantially identical to the flex information of the second flexible interface device 50 in a predetermined criterion. Or, the combined information of the two pieces of flex information may change the state of the first flexible interface device 50 and/or the second flexible interface device 50. Or, the combined information of the two pieces of flex information may cause the first flexible interface device 50 and/or the second flexible interface device 50 to perform a specific function.

Another example to which the present disclosure is applied is a device authentication method. The device authentication method includes an operation in which a plurality of flexible interface devices 50 are flexed due to an external force, an operation of acquiring a plurality of pieces of flex information generated when the flexible interface devices 50 are flexed, and an operation in which at least one of the flexible interface devices compares the pieces of flex information to each other to authenticate the flexible interface devices 50. The authentication operation may be an operation that is performed before transmission of data for authenticating a device for exchanging content.

Also, the authentication operation may be used as a method for checking whether a plurality of flexible interface devices approach each other when a specific function is performed using the plurality of interface devices 50.

Hereinafter, a flexible interface device in which the data transfer method as described above can be used will be described. For convenience of description, the flexible interface device 50 is assumed to be a flexible display device 100.

Figure 8:
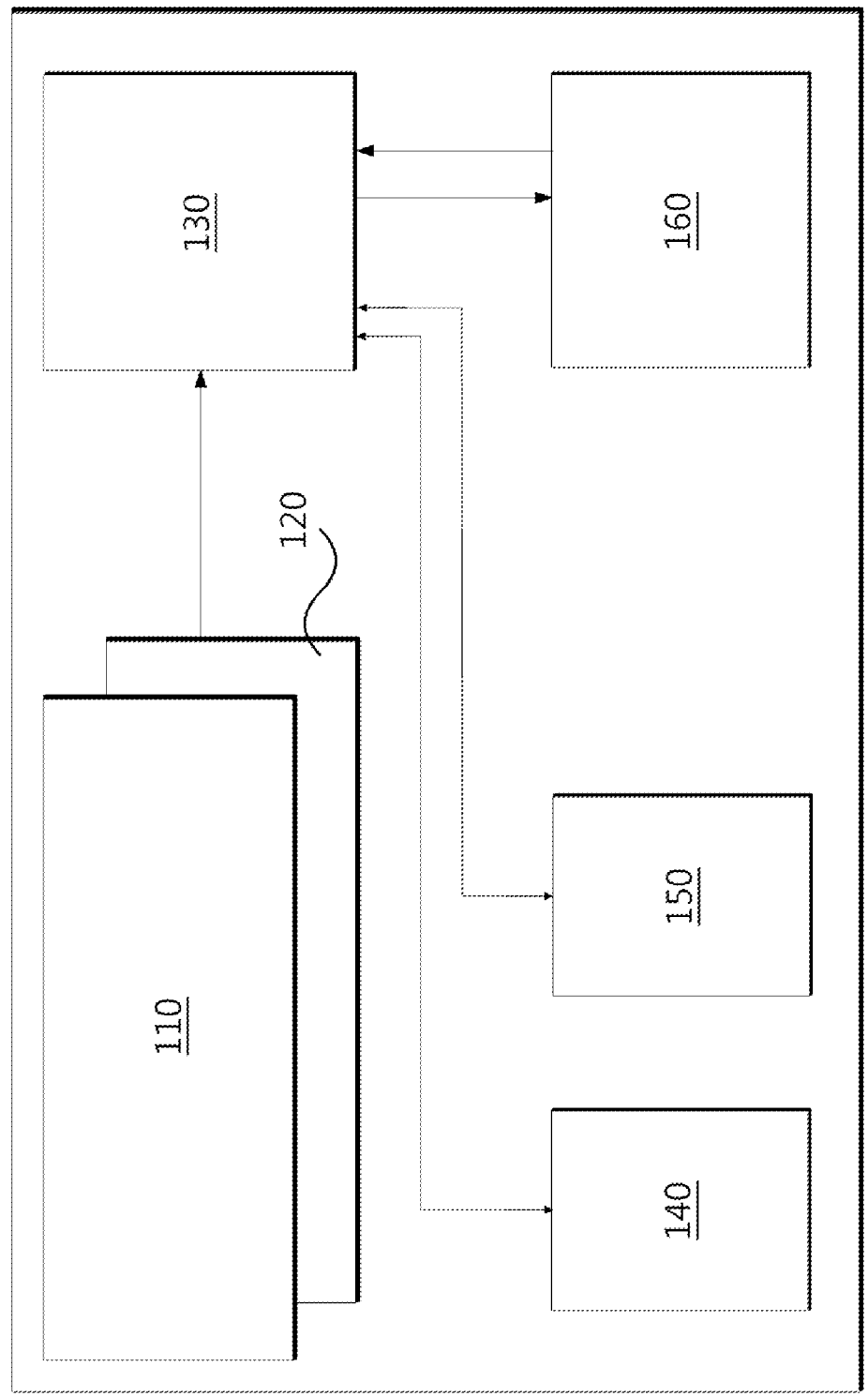
FIG. 8 is a block diagram illustrating a configuration example of a flexible display device.

FIG. 8 is a block diagram illustrating a configuration example of the flexible display device 100. Referring to FIG. 8, the flexible display device 100 includes a flexible display panel 110 capable of displaying data thereon even when the flexible display panel 100 is flexed, a flex sensor 120 for measuring flex information corresponding to a flex of the flexible display panel 110, a processor 130 for providing a data transfer command according to the flex information, a command table memory 140 for storing a command table in which data transfer commands match flex information, a data memory 150 for storing content, and a communication module 160 for transmitting or receiving content through wireless communication.

The flex sensor 120 is disposed below the flexible display panel 110, and the flex sensor 120 may be configured by arranging a plurality of flex sensors in a grid pattern on a flexible panel.

FIG. 9 shows an example in which a plurality of flex sensors (120 for each) are arranged in the flexible display (interface) device. Each flex sensor is denoted by F.S in FIG. 9. In FIG. 9, an area denoted by S and surrounded by dotted lines represents an area on which a screen is actually displayed.

Figure 10:
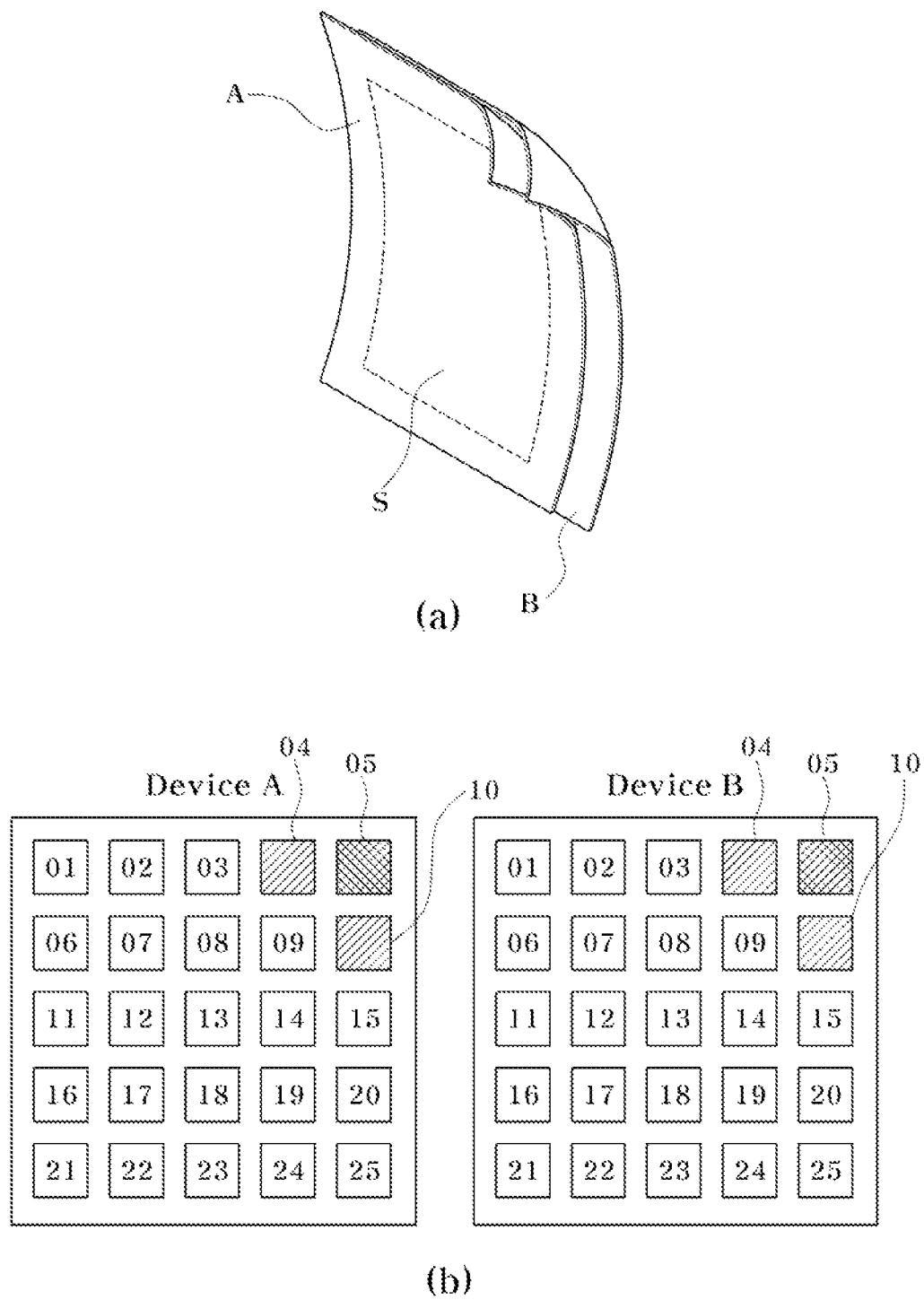
FIG. 10 shows an example in which flex sensors operate in flexible display (interface) devices.

FIG. 10 shows an example in which the flex sensors 120 operate in flexible display (interface) devices 100 (A and B). The example of FIG. 10 corresponds to the case in which the upper right portions of the flexible display devices A and B are flexed while the flexible display devices A and B are in contact with each other. In this case, three flex sensors located in the upper right portion of each of the flexile display devices A and B are enabled, and the degree of flex, the velocity of flex, the acceleration of flex, the direction of flex, the location of flex, etc. of the flexible display device A are identical to the corresponding ones of the flexible display device B. The number of flex sensors 120 included in each flexible display device 100 is 25, and the individual sensors 120 are allocated serial numbers in the arrangement order.

Parts represented by stripes are parts having a small degree of flex, and parts represented by cross stripes are parts having a great degree of flex. In both of the flexible display devices A and B, the flex sensors 04 and 10 have sensed a small degree of flex, and the flex sensor 05 has sensed a great degree of flex. In this case, it is determined that the flex information of the flexible display device A corresponds to the flex information of the flexible display device B. Also, it can be determined that the two flexible display devices 100 approach or come in contact with each other. The state in which the two flexible display devices 100 approach or come in contact with each other may be detected by a separate GPS terminal.

Figure 11:
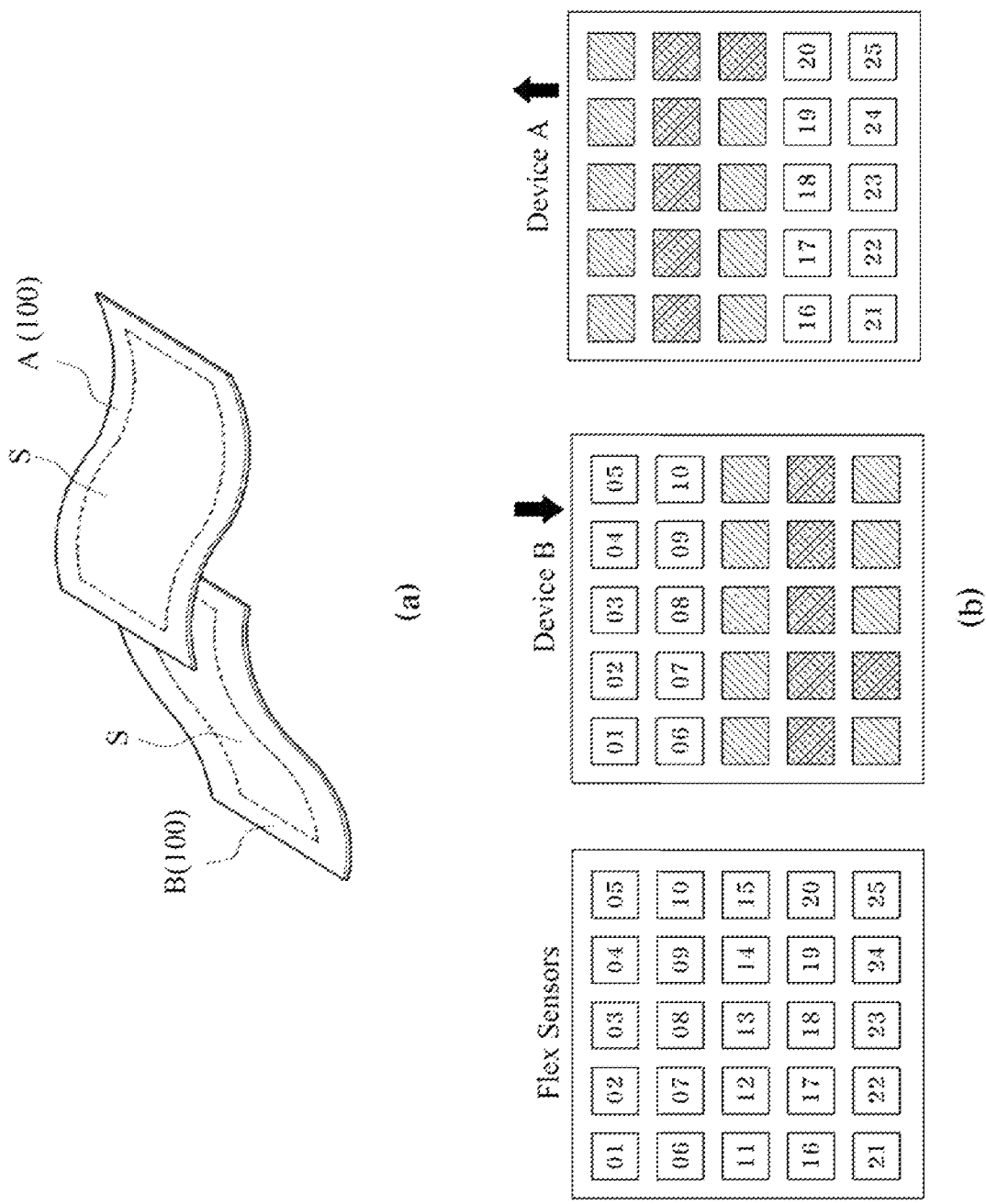
FIG. 11 shows an example in which flexible display (interface) devices recognize a flicking gesture through flex sensors.

FIG. 11 shows an example in which flexible display (interface) devices recognize a flicking gesture through flex sensors 120. (a) of FIG. 11 shows the state in which the flexible display devices 100 are flexed by a flicking gesture, and (b) of FIG. 11 shows values measured by the flex sensors 120 of the individual flexible display devices 100 in the state shown in (a) of FIG. 11. Also, parts represented by stripes are parts having a small degree of flex, and parts represented by cross stripes are parts having a great degree of flex. Although values measured by the flex sensors 120 of the flexible display devices A and B do not completely correspond to each other, a row configured with the flex sensors 06, 07, 08, 09, and 10 of the flexible display device A has been measured to have a great degree of flex, and a row configured with the flex sensors 16, 17, 18, 19, and 20 of the flexible display device B has been measured to have a great degree of flex. Also, the rows above and below the row showing the great degree of flex have been measured to have a small degree of flex. Accordingly, a correspondence between flex information of different flexible display devices may be determined based on average measurement values in the same direction, average measurement values of maximum degree of flex in the same rows or columns, etc. As described above, if flexible display devices 100 are flexed by a flicking gesture, a flicking gesture is determined by comparing patterns stored in the memories of the flexible display devices 100 to patterns that have been actually generated. Each of the memories that store the patterns may be a separate memory or the command table memory 140 described above.

The communication module 160 receives flex information measured by an adjacent flexible display device 100. Then, the processor 130 compares flex information measured by the source flexible display device 100 in which the processor 120 is included to flex information generated in the adjacent target flexible display device 100, and if it is determined that the flex information measured by the source flexible display device 100 corresponds to the flex information of the adjacent target flexible display device 100, the processor 130 provides a data transfer command based on the flex information, using the command table memory 140.

The flex information, comparison between the flex information, provision of a flex command, etc. have been described above, and a detailed description thereof will be omitted.

If at least one of the degrees of flex, the times at which flex begins, the time periods elapsed after flex begins, the time periods elapsed after a maximum degree of flex begins, the velocities of flex, the accelerations of flex, the velocities at which the flexed positions return to the original positions, the accelerations at which the flexed positions return to the original positions, the directions of flex, the locations of flex, the relative traces of flex, the numbers of times flex occurs in a reference time period, and the spatial locations of the flexible display devices 100, and the contact locations of the flexible display devices 100, among the flex information generated in the source flexible display device 100 and the target flexible display device 100, are identical to each other within the margin of error, the processor 130 determines that the flex information of the source flexible display device 100 corresponds to the flex information of the target flexible display device 100.

The margin of error may be set by a user or upon manufacture of the flexible display devices 100 according to the performance of the flex sensors 120 of the flexible display devices 100.

The processor 130 may interpret, as a data transfer command, at least one among a command for transmitting content from a source flexible interface device 100 to a target flexible interface device 100, a command for causing a source flexible interface device 100 to receive content from a target flexible interface device 100, a command for synchronizing the content of a source flexible interface device 100 with the content of a target flexible interface device 100, a command for transmitting or receiving content from a source flexible interface device 100 to a plurality of target flexible interface devices 1000, and a command for synchronizing the content of a source flexible interface device 50 with the content of a plurality of target flexible interface devices 50, according to the flex information.

The foregoing is illustrative of the present disclosure and is not to be construed as limiting thereof. Although numerous embodiments of the present disclosure have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of the present disclosure and is not to be construed as limited to the specific embodiments disclosed, and that modifications to the disclosed embodiments, as well as other embodiments, are intended to be included within the scope of the appended claims. The present disclosure is defined by the following claims, with equivalents of the claims to be included therein.

What is claimed is:

1. A flexible display device comprising:
   a display panel configured to allow display in a flexed position;
   a flex sensor configured to measure a first flex information corresponding to a flex of the flexible display panel;
   a data memory configured to store content;
   a communication module configured to receive a second flex information generated from another flexible display device adjacent to the flexible display device when the another flexible display device is flexed; and
   a processor configured to determine whether the first flex information corresponds to the second flex information.

2. The flexible display device of claim 1, wherein the first flex information is one or more pieces of information among a degree of flex, a time at which flex begins, a time period elapsed after flex begins, a time period elapsed after a maximum degree of flex begins, a velocity of flex, an acceleration of flex, velocity at which a flexed position returns to an original position, an acceleration at which a flexed position returns to an original position, a direction of flex, a location of flex, a relative trace of flex, the number of times flex occurs in a reference time period, a spatial location of the flexible interface device, a contact location of the flexible interface device, a combination of the one or more pieces of information, or a pattern created with the one or more pieces of information.

3. The flexible display device of claim 1, wherein
   the processor generates a data transfer command and the communication module transmits the content to the another flexible device or receive a second content from the another flexible device, if the first flex information corresponds to the second flex information.

4. The flexible display device of claim 3,
   wherein the processor synchronizes the content of the flexible device and a corresponding content of the another flexible device, and the communication module transmits the content to the another flexible device or receive the second content from the another flexible device.

5. The flexible display device of claim 3, wherein each piece of the first flex information and the second flex information includes at least one value among a direction of flex, the number of times flex occurs in a reference time period, and a spatial location of the flexible display device, and if the at least one value included in the first flex information and at least one value included in the second flex information are within a predetermined range, the processor determines that the first flex information corresponds to the second flex information.

6. The flexible display device of claim 3, wherein each piece of the first flex information and the second flex information includes at least one value among a degree of flex, a time at which flex begins, a time period elapsed after flex begins, a time period elapsed after a maximum degree of flex begins, a velocity of flex, an acceleration of flex, a velocity at which a flexed position returns to an original position, a direction of flex, a location of flex, the number of times flex occurs in a reference time period, a spatial location of the flexible display device, and a contact location of the flexible display device, and if the at least one value included in the first flex information and the at least one value included in the second flex information are within a predetermined range, the processor determines that the first flex information corresponds to the second flex information.

7. The flexible display device of claim 1, wherein the data transfer command is at least one command among a command for transmitting content from the flexible display device to the another flexible display device, a command for causing the flexible display device to receive content from the another flexible display device, a command for synchronizing content of the flexible display device with content of the another flexible display device, a command for transmitting content from the flexible display device to a plurality of other flexible display devices including the another flexible display device, a command for causing the flexible display device to receive content from the plurality of other flexible display devices, and a command for synchronizing content of the flexible display device with content of the plurality of other flexible display devices.

8. The flexible display device of claim 1, wherein a plurality of flex sensors are arranged in a plane-type grid pattern on the flexible display panel.

9. A method of synchronizing data between a plurality of flexible interface devices, comprising:
   acquiring a plurality of pieces of flex information at a plurality of flexible interface devices each flexed by external force;
   verifying, by at least one of the plurality of flexible interface devices, the plurality of pieces of flex information acquired at the plurality of flexible interface devices correspond to one another; and
   synchronizing, by the at least one of the plurality of flexible interface devices, data between the plurality of flexible interface devices, if the plurality of pieces of flex information acquired at the plurality of flexible interface devices correspond to one another.

10. The method of claim 9, wherein, if the plurality of flexible interface devices are flexed while in contact with each other, or if the plurality of flexible interface devices are flexed while spaced apart from each other, the data is transferred between the plurality of flexible interface devices.

11. The method of claim 9, wherein the synchronizing of the data between the plurality of flexible interface devices comprises:
   at a control server or at least one flexible interface device of the plurality of flexible interface devices, comparing the plurality of pieces of flex information to each other;
   at the control server or at the at least one flexible interface device, obtaining a data transfer command based on the plurality of pieces of flex information if the plurality of pieces of flex information correspond to each other; and
   synchronizing data between the plurality of flexible interface apparatuses according to the data transfer command.

12. The method of claim 11, wherein the comparing of the plurality of pieces of flex information to each other comprises, at the at least one flexible interface device, receiving flex information of another flexible interface device among the plurality of flexible interface devices through a communication module, and comparing the received flex information with flex information of the at least one flexible interface device.

13. The method of claim 11, wherein the comparing of the plurality of pieces of flex information to each other comprises, at the control server, receiving flex information of the plurality of flexible interface devices through a communication module, and comparing the received flex information.

14. The method of claim 9, wherein the synchronizing of the data between the plurality of flexible interface devices comprises synchronizing the data from a flexible interface device from which flex information is first generated, among the plurality of flexible interface devices, to another flexible interface device, the data being transferred in an order in which flex information is generated.

15. The method of claim 9, wherein, in the synchronizing of the data between the plurality of flexible interface devices, the at least one flexible interface device transfers the data to another flexible interface device of the plurality of flexible interface devices, and the data is transferred in a direction in which an internal angle made when the plurality of flexible interface devices are flexed decreases, or in a direction that is opposite to the direction.

16. The method of claim 9, further comprising,
performing authentication between the plurality of flexible interface devices using the data by the at least one flexible interface device of the plurality of flexible interface devices.

17. An operation method of a flexible interface device, comprising:
at a first flexible interface device that is in a first state, acquiring flex information of a second flexible interface device, wherein the flex information of the second flexible interface device corresponds to a flex of the second flexible interface device; and
at the first flexible interface device, changing the first state to a second state that is different from the first state, based on the flex information of the second flexible interface device.

18. The operation method of claim 17, wherein the second state has a higher power consumption than the first state.

19. The operation method of claim 17, wherein the first state is a state in which no data transfer occurs between the first and second flexible interface devices, or a state in which a data transfer rate between the first and second flexible interface devices is lower than a data transfer rate between the first and second flexible interface devices in the first state.

20. The operation method of claim 17, wherein the second state is a state in which a function corresponding to the flex information of the second flexible interface device is executed.

21. The operation method of claim 17, further comprising, at the first flexible interface device, acquiring flex information of the first flexible interface device, wherein the flex information of the first flexible interface device corresponds to a flex of the first flexible interface device,
wherein the changing of the first state to the second state comprises, at the first flexible interface device, changing the first state to the second state based on flex information of the first flexible interface devices and second flexible interface devices.

22. An operation method of a flexible interface device, comprising:
at a first flexible interface device, sensing a flex due to external force, and acquiring a first direction of a flex of the first flexible interface device and a second direction of a flex of a second flexible interface device;
at the first flexible interface device, determining the first direction and the second direction correspond to each other; and
at the first flexible interface device, transmitting or receiving data to or from another device based on the first direction of the flex of the first flexible interface device.

* * * * *